UNITED STATES PATENT OFFICE.

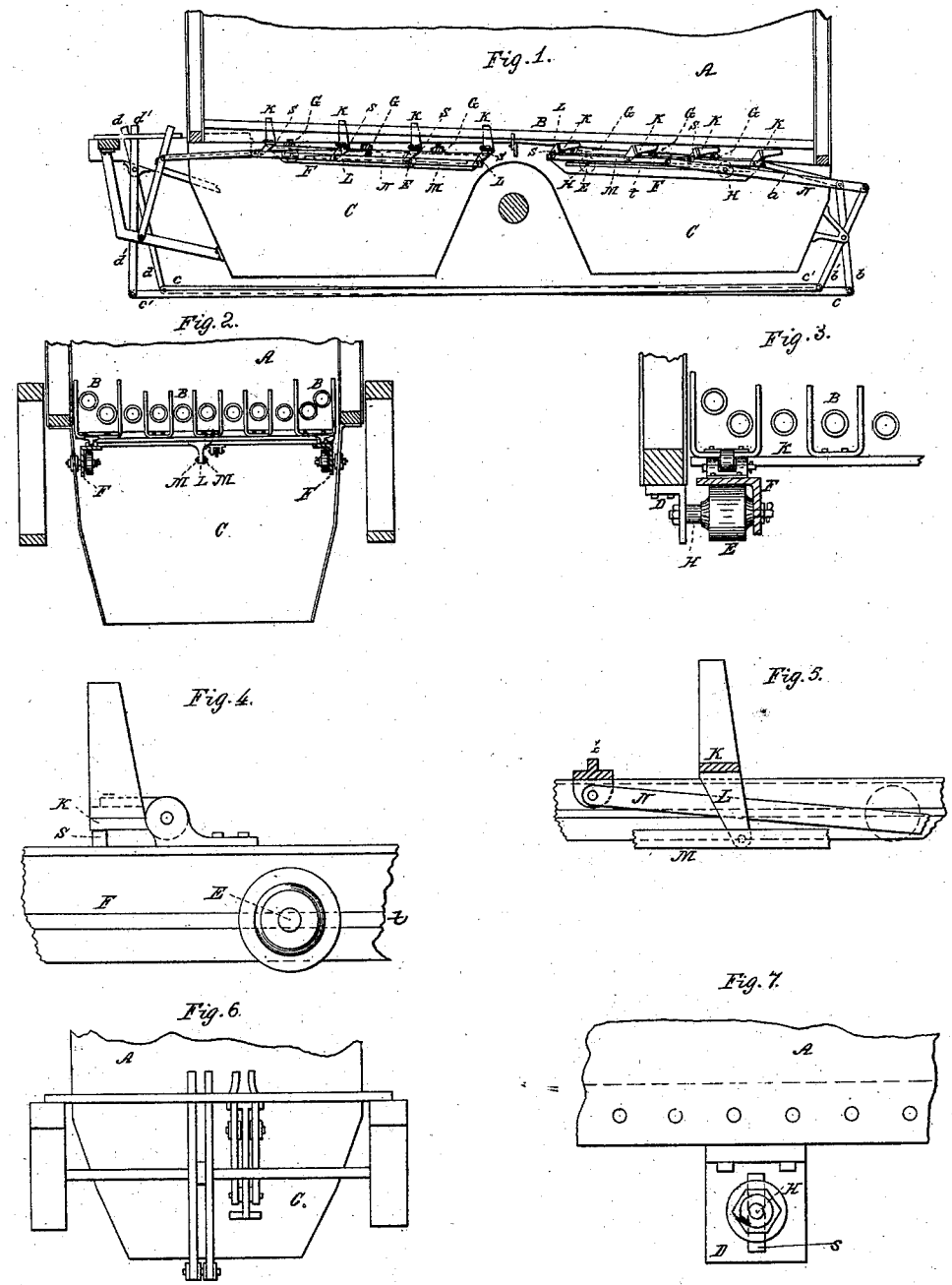

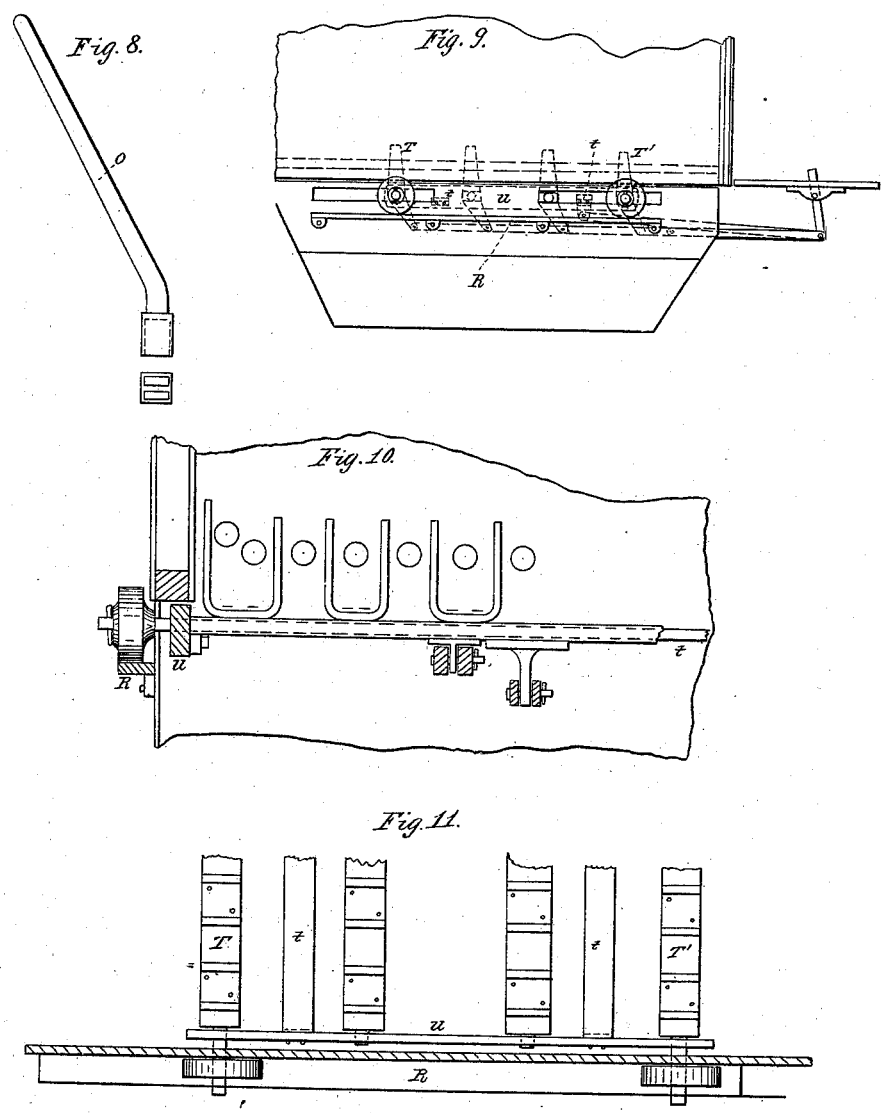

ARTHUR H. LEE, OF SCRANTON, PENNSYLVANIA, ASSIGNOR OF ONE-HALF TO THOMAS B. HOWE, OF SAME PLACE.

RAKING ATTACHMENT FOR FURNACES.

SPECIFICATION forming part of Letters Patent No. 268,913, dated December 12, 1882.

Application filed April 20, 1882. (No model.)

*To all whom it may concern:*

Be it known that I, ARTHUR H. LEE, of Scranton, in the county of Lackawanna and State of Pennsylvania, have invented certain new and useful Improvements in Raking Attachments for Furnaces; and I do hereby declare the following to be a full, clear, and exact description of the same, reference being had to the accompanying drawings, forming a part of this specification, and in which—

Figure 1 represents a longitudinal section of a locomotive-furnace provided with my improvements. Fig. 2 represents a transverse section of the same. Figs. 3, 4, 5, 6, 7, and 8 represent detail views, and Figs. 9, 10, and 11 detail views of a modification.

Similar letters of reference in the several figures denote the same parts.

My invention relates to that class of raking attachments for which Letters Patent of the United States No. 246,012 were granted to Thomas B. Howe, August 23, 1881; and it consists in certain novel improvements upon the same, which I will now proceed to describe.

In the drawings, A represents an ordinary hard-coal locomotive fire-box having grate-bars B of any suitable construction, though preferably hollow water-bars, as shown. Below the grate-bars is arranged an ash-pan, C, which may be of the shape shown, or of any other suitable shape. The fire-box represented is intended for a locomotive burning anthracite coal, and on account of its length two raking attachments are employed. As both attachments are alike, however, it will only be necessary to describe one of them—namely, the front one. D represents angular metal brackets bolted or otherwise fastened to the bottom rim of the boiler, as shown in Fig. 2, and each having a vertical slot, $s$, to permit of the adjustment up and down of a bolt, H, carrying a roller, E, as shown. These brackets may be supported by the ash-pan, if desired, as shown in Fig. 2; but I prefer the construction shown in Fig. 3. The rollers E support two angle-irons, F, one on each side of the fire-box, and these angle-irons are fastened rigidly together by means of tie-rods G, and are slotted longitudinally at $t$, so as to pass freely by the roller-pin H. Across the frame formed by the angle-irons and the tie-rods are a number of rows of raking-teeth, K, mounted on tooth-bars K', which are hinged to the angle-irons F, as shown in Figs. 1, 2, and 4, and which rest, when in normal position, upon the tie-rods G, as shown in Fig. 1, at the front end of the fire-box. At the middle of each tooth-bar, and extending therefrom at an angle of about forty-five degrees, there is a rigidly-attached arm, L. These arms L are all connected together by a rod, M, which in turn is connected through rods $a$, $b$, and $c$ to a pivoted lever, $d$, the upper end of which projects up through a slot in the foot-board of the engine. One of the rigid tie-rods G has a rod, N, articulated to it, and which is also connected through rods $b'$ $c'$ to another lever, $d'$, projecting up through the foot-board. The rods $b'$ $c'$ and lever $d'$ are of the same length and leverage as the rods $b$ $c$ and lever $d$.

When it is desired to rake the fire a double-socket lever, O, Fig. 8, is put on the lever $d$, and upon being pushed forward raises the rows of teeth into the fire, the teeth being prevented from going beyond a vertical position by the stops S on the angle-irons, as shown in Figs. 1 and 4. As the teeth assume a vertical position the lever $d$ comes alongside of the lever $d'$, and the double-socket lever is then put on both said levers $d$ and $d'$, so that the whole raking-frame, with the teeth projected, will move back and forth together. To lower or retract the teeth it is only necessary to engage the lever O with the lever $d$ alone.

By this arrangement of devices the fire can be cleared from below with the door shut, thus effecting a saving of fuel and steam. While I have shown and described my raking attachment applied to a hard-coal locomotive, it is obvious that it is equally applicable to those which burn soft coal, as well as to furnaces generally.

In Figs. 9, 10, and 11 I show a modification in which the rollers on the raker are supported on an angle-iron or bracket, R, outside of the ash-pan. The journals of the end rows of teeth, T T', are connected by side bars, U, which support the intermediate rows of teeth, and are themselves connected by cross-rods t t. The ash-pan is slotted for the play of the journals, as shown.

I claim as my invention—

1. The combination, with the grate-bars of the furnace, of a reciprocating frame having roller-bearings, and moving longitudinally of the grate-bars in guides below said bars, a series of rows of raking-fingers hinged to said reciprocating frame, and means, substantially as described, for raising and lowering said rows of fingers so as to project them between the grate-bars into the fire or to cause them to lie down below the grate-bars away from the fire, as set forth.

2. The combination, with the grate-bars of a furnace, of a reciprocating frame arranged below the grate-bars and carrying hinged rows of raking-fingers, and vertically-adjustable rollers for guiding and supporting the said reciprocating frame and regulating the extent of the projection of the fingers into the fire, substantially as described, for the purpose specified.

3. The combination, with the reciprocating frame, of the hinged rows of raking-fingers hinged to said frame, the lever $d$, and connecting-rods and levers for reciprocating the frame, the lever $d'$, and connecting-rods and levers for raising and lowering the hinged rows of raking-fingers, and the operating-handle having the two sockets, one of which is adapted to co-operate with the lever $d$ and the other with lever $d'$, whereby the hinged rows of raking fingers are adapted to be raised into the fire, and the reciprocating frame carrying said fingers is given a longitudinal movement with the fingers held in elevated position, all by means of a single operating-handle, substantially as described.

ARTHUR H. LEE.

Witnesses:
H. J. FOSTER,
T. B. HOWE.